United States Patent
Ono et al.

(10) Patent No.: US 6,767,631 B2
(45) Date of Patent: Jul. 27, 2004

(54) ADHESIVE COMPOSITIONS AND ADHESIVE SHEETS

(75) Inventors: Manabu Ono, Kanuma (JP); Toshifumi Kobayashi, Kanuma (JP)

(73) Assignee: Sony Chemicals Corp., Tokyo (JP)

( * ) Notice: Subject to any disclaimer, the term of this patent is extended or adjusted under 35 U.S.C. 154(b) by 22 days.

(21) Appl. No.: 10/053,769

(22) Filed: Jan. 22, 2002

(65) Prior Publication Data

US 2002/0142158 A1 Oct. 3, 2002

(30) Foreign Application Priority Data

Jan. 22, 2001 (JP) .................................... 2001-013204
Feb. 20, 2001 (JP) .................................... 2001-042977

(51) Int. Cl.$^7$ ............................................... B32B 27/30
(52) U.S. Cl. ....................... 428/355 AC; 428/355 CN; 522/173; 522/176; 522/150; 522/151; 522/152; 522/167

(58) Field of Search ................... 428/355 AC, 355 CN; 522/173, 176, 150, 151, 152, 167, 174

(56) References Cited

U.S. PATENT DOCUMENTS 6,503,961 B1 * 1/2003 Okazaki et al. ............. 522/173

* cited by examiner

*Primary Examiner*—David J. Buttner
*Assistant Examiner*—Christopher Keehan
(74) *Attorney, Agent, or Firm*—Osha & May L.L.P.

(57) ABSTRACT

The present invention aims to provide an adhesive composition showing high adhesion and cohesion as well as good heat resistance. Adhesive compositions of the present invention include an imide (meth)acrylate, a monomer having a glass transition temperature of −50° C. or less when it is homopolymerized, and a photoinitiator, wherein the content of the imide (meth)acrylate is 1–20 parts by weight per 100 parts by weight of the monomer.

5 Claims, 2 Drawing Sheets

ADHESIVE COMPOSITIONS AND ADHESIVE SHEETS

FIELD OF THE INVENTION

The present invention relates to adhesive compositions showing adhesive properties upon irradiation (with UV rays, for example) and adhesive sheets prepared therefrom.

PRIOR ART

Generally, one-pack solvent-free acrylic adhesive compositions that contain monomer as polymerization component and initiator, comprise a hard segment component showing a relatively high glass transition temperature (Tg) (e.g., about 60 to 180° C.) and conferring high cohesion on adhesives (such as acrylic acid, methyl methacrylate, etc.), a soft segment component showing a relatively low glass transition temperature (eg, about −90 to −20° C.) and conferring high adhesion on adhesives (such as butyl acrylate (Tg=−54 ° C.), 2-ethylhexyl acrylate (Tg=−85° C.), etc.), a component showing an intermediate glass transition temperature (e.g., about −20 to 60° C.) (such as t-butyl acrylate (Tg=41° C.), vinyl acetate, etc.), and a photoinitiator. The acrylic adhesive composition is cured by irradiation to show adhesive properties (JPA No. 2000-073025, etc.).

However, adhesive compositions such as those described above have the disadvantage that, when the content of the soft segment component is increased to further improve adhesion, the content of the hard segment component relatively decreases to lower cohesion and on the contrary, when the content of the hard segment component is increased to further improve cohesion, the content of the soft segment component relatively decreases to lower adhesion. Thus, no adhesive compositions achieving high adhesion and high cohesion at the same time have been obtained.

One important application of solvent-free acrylic adhesive compositions is the use as adhesives for bonding a backing film to a flexible circuit board. However, conventional solvent-free acrylic adhesive compositions are insufficient in heat resistance against the lead-free solder technique that has recently come to be used in this field of application and has a melting point 30 to 40° C. higher than that of traditional solder, and tackiness of adhesives is impaired during the solder reflow processes.

What is needed, therefore, is an adhesive composition that shows high adhesion and cohesion as well as good heat resistance.

SUMMARY OF THE INVENTION

In one aspect, the present invention relates to adhesive compositions containing a major component monomer having a glass transition temperature of −50° C. or less when it is homopolymerized and an imide (meth)acrylate in a specific ratio that show high adhesion and high cohesion at the same time while maintaining heat resistance.

Accordingly, in one aspect the present invention provides an adhesive composition comprising an imide (meth) acrylate, a homopolymerizable monomer having a glass transition temperature of −50° C. or less when it is homopolymerized, and a photoinitiator, wherein the content of the imide (meth)acrylate is 1 to 20 parts by weight per 100 parts by weight of the monomer.

In another aspect, the present invention provides an adhesive composition wherein the imide (meth)acrylate is 2-(perhydrophthalimide-N-yl)ethyl acrylate.

In another aspect, the present invention comprises an adhesive composition that includes 1 to 5 parts by weight of a compound per 100 parts by weight of the homopolymerizable monomer, and the compound is copolymerizable with the homopolymerizable monomer.

In one aspect, the present invention comprises an adhesive composition wherein the compound that is copolymerizable with homoplymerizalbe monomer includes at least one member selected from the group of acrylic acid, isobornyl acrylate and morpholine acrylate.

In one aspect, the present invention also provides an adhesive sheet comprising an adhesive layer where the adhesive layer is formed by curing an adhesive composition. The adhesive composition includes imide (meth)acrylate and homopolymerizable polymer and photoinitiator, wherein a glass transition temperature of the homopolymerizable monomer is −50° C. or less when it is homopolymerized, and the content of the imide (meth) acrylate is 1 to 20 parts by weight per 100 parts by weight of the monomer.

DETAILED DESCRIPTION

Figure 1A:
FIGS. 1a–1c show a process for manufacturing adhesive sheet according to one embodiment of the present invention.

The present invention will now be explained in detail.

Adhesive compositions of the present invention comprise an imide (meth)acrylate, a monomer having a glass transition temperature of −50° C. or less when it is homopolymerized, and a photoinitiator. As used herein, the term "(meth)acrylate" means to include both acrylate and methacrylate.

Preferably, the imide (meth)acrylate used in the present invention can be selected from compounds of below mentioned formulae (1)–(3). Such an imide (meth)acrylate shows high adhesion because of the excellent polymerizability and also shows high cohesion because of the high polarity of the imide residue in the molecule.

General formula 1

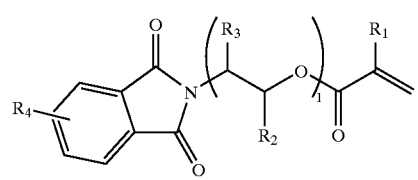

General formula 2

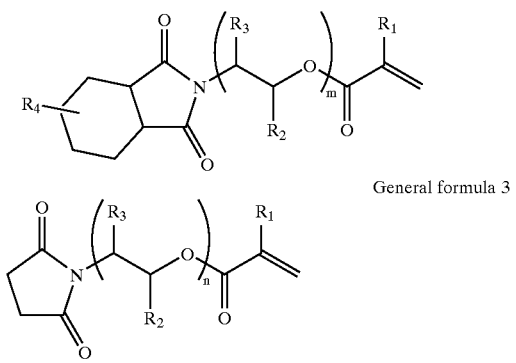

General formula 3

In formulae (1)–(3), substituent $R_1$, $R_2$ and $R_3$ represent H or $CH_3$, substituent $R_4$ represents H or a lower alkyl group containing 1 to 5 carbon atoms, 1 represents whole number as 2 or 3, m represents whole number as 1–3, and n represents whole number as 1 to 3.

Compounds of formula (1) are imide (meth)acrylates having a phthalimide skeleton, among which compounds wherein substituent $R_1$, $R_2$, $R_3$ and $R_4$ represent a hydrogen atom respectively, and 1 represents 2 are preferred. Compounds of formula (2) are imide (meth)acrylates having a hexahydrophthalimide skeleton, among which compounds wherein substituent $R_1$, $R_2$, $R_3$ and $R_4$ represent a hydrogen atom respectively, and m represents 1 are preferred (e.g., 2-(perhydrophthalimide-N-yl)ethyl acrylate). Compounds of formula (3) are imide (meth)acrylates having a maleimide skeleton, among which compounds wherein substituent $R_1$, $R_2$, $R_3$ and $R_4$ represent a hydrogen atom respectively, and n represents 1 are preferred. Among the compounds of above-mentioned formula (1) to (3), 2-(perhydrophthalimide-N-yl)ethyl acrylate is especially preferred.

Imide (meth)acrylate showing the above mentioned compounds of formulae (1) to (3) can be prepared by known processes (Kato et al., Journal of the Association of Organic Synthetic Chemistry 30(10), 897, (1972); Javier de Abajo et al., Polymer, vol. 33(5), (1992); JPA Nos. 1981-53119 and 1989-242569).

The content of the imide (meth)acrylate in adhesive compositions of the present invention comprise about 1 to about 20 parts by weight, preferably 5 to 15 parts by weight per 100 parts by weight of the homopolymerizable monomer as described below. If the content of the imide (meth) acrylate per 100 parts by weight of the homopolymerizable monomoer is less than about 1 part by weight, heat resistance of the adhesive is lowered, which leads to insufficient high-temperature creep resistance. If it exceeds about 20 parts by weight, initial tackiness appearing when the tackiness agent is polymerized, becomes too low for adhesive functions.

For the major component, if a monomer having a glass transition temperature (Tg) higher than −50° C. when it is homopolymerized is used, the tackiness is lowered. Thus, it is preferable to use a monomer showing a glass transition temperature (Tg) of −50° C. or less when it is homopolymerized as a major component. Such monomers preferably include esters of an acrylic acid with an alkyl alcohol containing 4 to 14 carbon atoms, specifically butyl acrylate (Tg of homopolymer=−54° C.), n-propyl acrylate (Tg of homopolymer=−52 ° C.), 2-ethylhexyl acrylate (Tg of homopolymer=−85° C.), nonyl acrylate (Tg of homopolymer=−85° C.), isooctyl acrylate, lauryl acrylate, etc. Among them, 2-ethylhexyl acrylate is especially preferred because it has a low glass transition temperature and it is available at low cost.

The method for homopolymerization of the above-described monomer is preferably radical polymerization. For the condition of polymerization, it is preferable to use UV-activated polymerization conditions that adding photoinitiator to the monomer, and then polymerizing the monomer by irradiation of Ultraviolet rays.

Suitable photoinitiators for use in adhesive compositions of the present invention include acetophenone photoinitiators, benzophenone photoinitiators and thioxanthone photoinitiators. Especially, thioxanthone photoinitiators that tend to trigger photopolymerization even in the presence of oxygen are preferably used in combination with other photoinitiators.

Acetophenone photoinitiators preferably include 2,2-dimethoxy-2-phenylacetophenone, etc. Benzophenone photoinitiators preferably include 1-hydroxycyclohexyl phenyl ketone, etc. Thioxanthone photoinitiators preferably include 2,4-diethyl thioxanthone, 2-methyl thioxanthone, etc., which belong to hydrogen abstraction initiators. They are preferably used in combination with coinitiators such as n-methyldiethanolamine, p-dimethylaminobenzoic acid ethyl ester and p-dimethylaminobenzoic acid isoamyl ester.

The amount of photoinitiators used in adhesive compositions of the present invention is normally about 0.05–1.0 parts by weight per 100 parts by weight of the homopolymerizable monomer. The amount of thioxanthone photoinitiators used in combination with other photoinitiators is normally about 0.03–0.5 parts by weight per 100 parts by weight of the homopolymerizable monomer.

Adhesive compositions of the present invention may optionally further contain 1 to 50 parts by weight, preferably 10 to 25 parts by weight of a compound that is copolymerizable with the homopolymerizable monomer per 100 parts by weight of the monomer.

Such copolymerizable compounds with homopolymerizable monomer, include monomers having a glass transition temperature above −50° C. when it is homopolymerized, e.g., acrylic acid (Tg of homopolymer=90° C.), acrylic acid esters of cyclic alkyl alcohols and alkyl alcohols containing 3 or less carbon atoms (Tg of homopolymer=−5° C.), and acrylic acid derivatives such as ethyl acrylate (Tg of homopolymer=−22° C.), 2-hydroxyethyl acrylate (Tg of homopolymer=−15° C.), isobomyl acrylate (Tg of homopolymer=90° C.), morpholine acrylate (Tg of homopolymer=145° C.), etc. Oligoester acrylates such as phenoxydiethylene glycol acrylate (Tg of homopolymer=−25 ° C.) may also be used. Especially, acrylic acid, isobomyl acrylate and morpholine acrylate can be preferably used.

Polyfunctional oligoacrylates having a molecular weight of 300 or more, containing esters of di- or poly-acrylic acid with a polyol may also be used as another example of compound that are copolymerizable with the homopolymerizable monomer. When such a polyfunctional oligoacrylate is contained, cohesion of the adhesive at high temperatures can be further improved. Polyfunctional oligoacrylates having a Molecular weight of 300 or greater are preferred. If the molecular weight is less than 300, the distance between crosslinked molecules becomes so short that minor changes in the content of the polyfunctional oligoacrylate have great influence on the cohesion of the adhesive layer and make it difficult to control the cohesion.

Suitable polyfunctional oligoacrylates preferably include those having 10 or more carbon atoms of the vinyl groups between two ester groups, such as polyalkylene glycol diacrylates such as enneaethylene glycol diacrylate, ethylene oxide-modified bisphenol A diacrylate, hydroxypivalic acid neopentyl glycol diacrylate, urethane acrylate, etc.

If such a polyfunctional oligoacrylate is used, the amount is preferably about 0.0001 to about 0.002 parts by weight, more preferably about 0.0005 to about 0.0015 parts by weight per 100 parts by weight of the homopolymerizable monomer because smaller amounts have insufficient heat resistance-improving effect on the adhesive layer while too large amounts lessen tackiness of the adhesive layer.

Solvent-free adhesive compositions of the present invention can be prepared by uniformly mixing, by any standard method, and comprises an imide (meth)acrylate, a major component monomer having a glass transition temperature of −50° C. or less when it is homopolymerized, and a photoinitiator and optionally a polymerizable compound as described above.

It is unnecessary to use organic solvent such as diluent for manufacturing the adhesive composition of the present invention, because the homopolymerizable monomer as a major component is liquid at ordinary temperature. Thus, the adhesive composition of the present invention does not require the presence of a solvent.

The process for manufacturing an adhesive sheet using the adhesive composition of the present invention is described below.

Figure 1B:
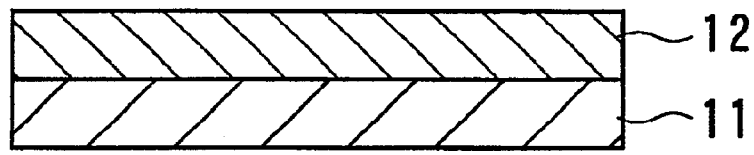
Figure 1C:
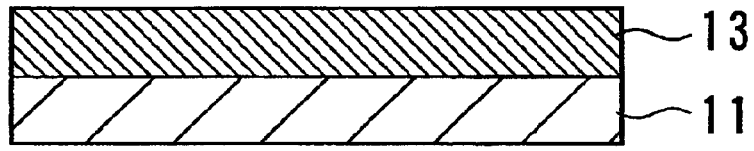
Figure 2A:
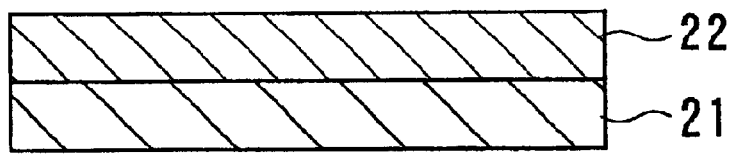
FIGS. 2a–2e show a process for manufacturing nonsupport type adhesive sheet according to another embodiment of the present invention.
Figure 2B:
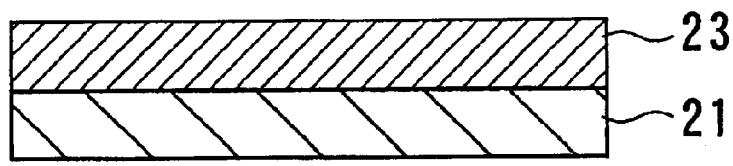
Figure 2C:
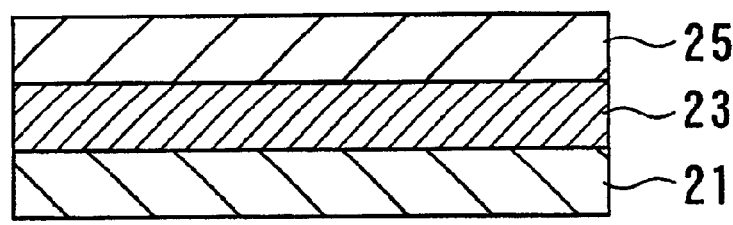
Figure 2D:
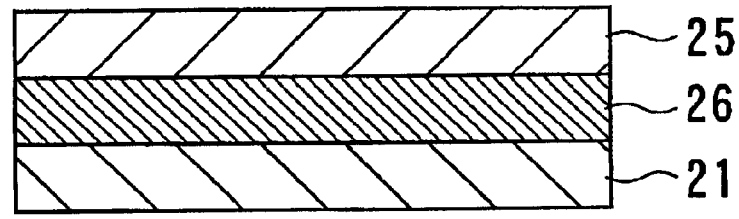
Figure 2E:

Reference numeral 11 of FIG. 1(*a*) designates a base sheet. The adhesive composition manufactured as above-mentioned is applied on the surface of the base sheet 11 to form an applied layer 12 of the adhesive composition as shown in FIG. 1 (*b*).

Next, active energy rays (e.g., UV rays) irradiate the surface of the applied layer 12. The homopolyerizable monomer and imide (meth)acrylate are copolymerized, and the adhesive composition comprising the applied layer is cured.

Reference numeral 13 of FIG. 1(*c*) designates an adhesive layer comprising a cured applied layer 12. An adhesive sheet 10 comprises the adhesive layer 13 and the base sheet 11.

Although it is explained the adhesive sheet 10 comprised a base sheet 11 and an adhesive layer 13 as mentioned above, the present invention is not limited such an embodiment.

Reference numeral 21 of FIG. 2(*a*) designates a release sheet. An applied layer 22 comprising the adhesive composition on the surface of the release sheet using the same process as mentioned-above, and then, irradiating active energy rays to some degree that the applied layer is not cured completely. The adhesive composition comprising the applied layer 22 is semi-cured (the semi-cured state, hereinafter referred to as B staged).

Reference numeral 23 of FIG. 2(*b*) designates a B staged applied layer. The surface of the base sheet 25 is pressed to the opposite side to the release sheet of the applied layer, and the base sheet 25 is adhered to the applied layer 23.

FIG. 2(*c*) shows a state that the base sheet 25 is adhered to the applied layer 23. At least one of the release sheet 21 and base sheet 25 have a light transmission. When an active energy ray irradiates to the sheets 21 and 25 having a light transmission, the light transmits through the sheets 21 and 25, and the light reaches to the B staged applied layer. The copolymerization of the monomer and imide (meth)acrylate in the applied layer 23 is advanced by the sufficient irradiation of the light to the B staged applied layer 23, and in the result, the applied layer is cured completely.

Reference numeral 26 designates an adhesive layer of which the applied layer 23 is completely cured. The adhesive layer is formed in a film-shape by curing. The adhesive layer 26 can be used as a non-support type adhesive sheet when the base sheet and the release sheet are removed from the adhesive layer 26 as shown in FIG. 2(*e*).

The substrate sheet can be identical with those of conventional adhesive sheets. The thickness of the adhesive layer can also be identical with those of conventional adhesive sheets.

The following examples further illustrate the present invention.

EXAMPLES

Examples 1–7, Comparative examples 1–2

Liquid UV-curable adhesive compositions were prepared for the examples 1 to 7 and comparative examples 1 and 2, by homogeneously mixing components shown in below-described Table 1 by a standard method.

2-Ethyl hexyl acrylate having a glass transition temperature of −85° C. when it is homopolymerized, is used for a homopolymerizable monomer. For the copolymerizable compounds with homopolymerizable monomer, isobonyl acrylate, acrylic acid, morpholine acrylate are used respectively, and for the imide (meth)acrylate, 2-perhydro phthalimide-N-yl ethyl acrylate is used.

Each of the resulting adhesive compositions was respectively applied on a release paper (release sheet) 21 obtained by treating both sides of a blue-green release base showing 5 GB on the hue circle in the Munsell color system with a releasant silicone, to form an applied layer 22. Then, the applied layer 22 was B-staged by irradiating light from an UV lamp as active energy rays to the surface of the applied layer 22.

Next, a transparent PET (polyethylene terephthalate) film having a thickness of 50 $\mu$m treated with silicone on one side was applied thereon was prepared for base sheet 25. The silicone treated surface of the base sheet 25 was superposed to the surface of the B-staged applied layer 23. The assembly was compressed between two rolls so that the applied layer 23 had a thickness of 50 $\mu$m. Thus obtained laminate was irradiated with light from a UV lamp (dominant wavelength:

365 nm, 50 mW/cm$^2$) at the PET film side to completely cure the applied layer 23. The release paper 21 and the PET film were removed to prepare nine types of non-supported adhesive sheet comprising adhesive layer 26. Nine types of test pieces are formed with thus obtained nine types of adhesive sheet and stainless steel sheets (SUS306), according to "13. Holding power" of JIS Z0237. The holding power (mm) was measured using these test pieces at the condition of measurement atmosphere 80° C. and load 1 kg weight (9.8 N).

evaluated for tackiness and appearance after treatment. The peak temperature of the inner furnace is 260° C. and heating time is 20 seconds.

The evaluation standards are as follows: "O" means no change in tackiness and appearance; "Δ" means changes observed in tackiness or appearance but suitable for practical use; "x" means considerable changes observed in tackiness and appearance and unsuitable for practical use. The results are shown in Table 1.

TABLE 1

Formulation of adhesive compositions and evaluation test

|  |  | Examples | | | | | | | Comparative examples | |
|---|---|---|---|---|---|---|---|---|---|---|
|  |  | 1 | 2 | 3 | 4 | 5 | 6 | 7 | 1 | 2 |
| Formulation (parts by weight) | 2-Ethylhexyl acrylate | 100 | 100 | 100 | 100 | 100 | 100 | 100 | 100 | 100 |
|  | Isobornyl acrylate | 2 | 2 | 2 | 2 | 2 | 2 | 2 | 2 | 2 |
|  | Acrylic acid | 7 | 7 | 7 | 7 | 7 | 7 | 7 | 7 | 7 |
|  | Morpholine acrylate | 5 | 5 | 5 | 5 | 5 | 5 | 5 | 5 | 5 |
|  | Imide acrylate | 1 | 3 | 5 | 9 | 12 | 15 | 18 | 0 | 21 |
|  | Photoinitiator | 0.3 | 0.3 | 0.3 | 0.3 | 0.3 | 0.3 | 0.3 | 0.3 | 0.3 |
| Evaluation results | Holding power (mm) | 1.6 | 1.4 | 1.1 | 1.0 | 0.9 | 0.7 | 0.6 | 1.6 | 0.5 |
|  | Peel strength (N/cm) GE | 3.8 | 4.1 | 4.2 | 4.6 | 4.2 | 3.9 | 4.7 | 3.8 | 4.5 |
|  | PID | 4.1 | 4.2 | 4.4 | 4.6 | 4.4 | 4.2 | 4.9 | 3.9 | 4.4 |
|  | PET | 3.9 | 4.2 | 4.3 | 4.5 | 3.4 | 3.4 | 3.7 | 3.8 | 3.6 |
|  | Tackiness | Δ | Δ | O | O | O | O | Δ | X | X |

*In table 1 above, GE, PID and PET mean a glass epoxy sheet, a polyimide film and a polyester film used as adhered body, respectively.

The results are shown in Table 1. In the holding power, lower values (mm) mean better cohesion.

The cured adhesive composition (adhesive sheet) by irradiating of light as above-mentioned process, wasput between a surface material and an adhered body. The surface material and the adhered body were adhered to the adhesive sheet under a load of 10 N/cm, thus obtaining the test pieces.

For the adhered body, a glass epoxy (GE) sheet having a thickness of 0.5 mm (made by Sumitomo Bakelite Co., Ltd.), a polyimide (PID) film having a thickness of 0.025 mm (made by Du Pont-Toray Co., Ltd.) were used. A polyester (PET) film having a thickness of 0.2 mm (made by Toray Industries, Inc.) was used for the surface material. Three types of test pieces were prepared by the combination of the adhered bodies and surface materials.

Then, a tip portion of the surface material was pulled with peel off speed of 50 mm/min by the angle of 90° to the surface of the adhered body, and the power (peel off strength N/cm) when the surface material is released from the adhered body is measured.

A glass epoxy board having a thickness of 2 mm was previously adhered to the back surface of adhered body except of glass epoxy board. Each adhered body is fixed to the glass epoxy board, so that the adhered body is not folded when the surface material is peeled off.

The results are shown in Table 1. In the peel off strength, higher values mean better adhesion.

Non-supported adhesive sheets were freshly prepared by the procedure described above and treated with heating in a lead-free solder reflow furnace and then organoleptically The tackiness is evaluated according to following condition: putting a clean fingertip on the surface of the non-support type adhesive sheet, and immediately releasing the fingertip from the adhesive sheet at ordinary temperature. When the peel resistance is felt by the fingertip, the state is evaluated as "tackiness", and when the peel resistance is not felt by the fingertip, the state is evaluated as "no tackiness". "No tackiness" means that the tackiness is lost from the adhesive sheet by the heat treatment.

The results of Table 1 show that adhesive sheets formed from adhesive compositions containing 1 to 20 parts by weight of an imide (meth)acrylate per 100 parts by weight of the major component 2-ethylhexyl acrylate achieved a good balance between improved cohesion and adhesion. Moreover, the results of Examples 3 to 6 show that heat resistance of adhesive sheets can be further improved when the content of the imide acrylate is 5 to 15 parts by weight per 100 parts by weight of 2-ethylhexyl acrylate.

Adhesive compositions of the present invention show high adhesion and cohesion as well as good heat resistance. Therefore, adhesive compositions of the present invention can be used to provide an adhesive sheet capable of withstanding lead-free solder reflow processes while maintaining high adhesion and cohesion.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An adhesive composition comprising an imide (meth)acryLate, a homopolymerizable monomer, a photoinitiator, and a compound that is copolymerizable with the homopolymerizable monomer, wherein a glass transition temperature of the homopolymerizable monomer is −50° C. or less when it is homopolymerized, and wherein the content of the imide (meth)acrylate is 1 to 20 parts by weight per 100 parts by weight of the homopolymerizable monomers wherein the content of the compound that is copolymerizable with the homopolymerizable monomer is 1 to 50 parts by weight of a compound per 100 parts by weight of the homopolymerizable monomer, and wherein the compound that is copolymerizable with the homopolymerizable monomer comprises at least one member selected from the group consisting of acrylic acid, isobornyl acrylate, and morpholine acrylate.

2. The adhesive composition according to claim 1 wherein the imide (meth)acrylate is 2-(perhydrophthalimide-N-yl) ethyl acrylate.

3. An adhesive sheet comprising an adhesive layer, wherein the adhesive layer comprises a cured adhesive composition, and wherein the adhesive composition comprises imide (meth)acrylate, a homopolymerizable polymer, a photoinitiator, and a compound that is copolymerizable with the homopolymerizable monomer, wherein a glass transition temperature of the homoplymerizable monomer is −50° C. or less when it is homopolymerized, and wherein the content of the imide (meth)acrylate is 1 to 20 parts by weight per 100 parts by weight of the homopolymerizable monomer, wherein the content of the compound that is copolymerizable with the homopolymerizable monomer is 1 to 50 parts by weight of a compound per 100 parts by weight of the homopolymerizable monomer, and wherein the compound that is copolymerizable with the homopolymerizable monomer comprises at least one member selected from the group consisting of acrylic acid, isobornyl acrylate, and morpholine acrylate.

4. An adhesive sheet according to claim 3, further comprising a base sheet, wherein the adhesive layer is formed on the base sheet.

5. An adhesive sheet according to claim 3 wherein the adhesive sheet is shaped as a film-shape.

* * * * *